United States Patent [19]

Suzuki et al.

[11] Patent Number: 5,091,435
[45] Date of Patent: Feb. 25, 1992

[54] CROSS-LINKABLE, FOAMABLE POLYOLEFIN RESIN COMPOSITION

[75] Inventors: Toshiaki Suzuki; Sotoyuki Kitagawa; Takashi Nakayama; Takao Kuno, all of Kawasaki, Japan

[73] Assignee: Tonen Chemical Corporation, Tokyo, Japan

[21] Appl. No.: 726,075

[22] Filed: Jul. 5, 1991

[30] Foreign Application Priority Data

Jul. 4, 1990 [JP] Japan .................... 2-177161

[51] Int. Cl.$^5$ .............................................. C08J 9/10
[52] U.S. Cl. ........................................ 521/134; 264/54; 264/DIG. 18; 521/59; 521/60; 521/142; 521/143; 525/194; 525/240
[58] Field of Search ........... 521/60, 59, 134, 142, 521/143; 264/54, DIG. 18; 525/194, 240

[56] References Cited

U.S. PATENT DOCUMENTS

| | | | |
|---|---|---|---|
| 4,746,706 | 5/1988 | Nakagawa | 521/60 |
| 4,761,431 | 8/1988 | Nakamura | 521/60 |
| 4,766,157 | 8/1988 | Yamada et al. | 521/60 |
| 4,777,000 | 10/1988 | Keiwabera et al. | 521/60 |
| 4,889,671 | 12/1989 | Akujama et al. | 521/60 |

*Primary Examiner*—Morton Foelak
*Attorney, Agent, or Firm*—Armstrong, Nikaido, Marmelstein, Kubovcik & Murray

[57] ABSTRACT

The cross-linkable, foamable polyolefin resin composition capable of forming foams with excellent mechanical properties and heat resistance is made of (a) 30-80 weight % of a propylene-ethylene random copolymer having an ethylene content of 1.5-6 weight %; (b) 10-60 weight % of a propylene-ethylene random copolymer having an ethylene content of 0.2-1.0 weight %; (c) 10-60 weight % of a linear low-density polyethylene; and (d) 1-30 parts by weight, per 100 parts by weight of the above resin components, of a foaming agent.

4 Claims, No Drawings

CROSS-LINKABLE, FOAMABLE POLYOLEFIN RESIN COMPOSITION

BACKGROUND OF THE INVENTION

The present invention relates to a cross-linkable, foamable polyolefin resin composition, and more particularly to a cross-linkable, foamable polyolefin resin composition showing excellent sheet moldability, mechanical properties, formability and heat resistance without substantially deteriorating the mechanical properties and heat resistance peculiar to polypropylene.

Polyolefin foams are excellent in mechanical strength, softness, hand, heat resistance, chemical resistance, etc., so that they are widely used for interior materials of automobiles, heat insulators, sporting goods, cushions for food wrappings, sound dampers, exterior materials, etc.

Among them, polyethylene foams have excellent softness, hand, elongation, etc. because of their low melting points. On the other hand, polypropylene foams are excellent in mechanical strength such as a tensile strength, a bending strength, etc. and a heat resistance, but because of their high melting points, they should be heated to a high temperature in the process of foaming or cross-linking, leading to the molecular scission of polypropylene, whereby large and uneven cells are likely to be formed. Moreover, since usual foaming agents tend to decompose at about 170° C., they are not suitably used for polypropylene resins having high melting points. Also, since foaming agents having high decomposition temperatures can produce only small amounts of gas, a large amount of foaming agents are needed to obtain sufficiently high foaming ratios.

To obviate the problems inherent in the polypropylene resins, a proposal was made to provide a cross-linkable, foamable resin composition comprising a propylene-ethylene random copolymer and a linear low-density polyethlene (Japanses Patent Laid-Open No. 57-212236).

However, since a propylene-ethylene random copolymer having a large ethylene content is used in the above composition, it is difficult to obtain foams having sufficient high-temperature properties, particularly a heat resistance sufficiently high to carry out the forming process such as vacuum molding, stamping, etc.

Further, proposals were made to provide a composition comprising polyethlene and/or an ethylene copolymer such as a liner low-density polyethylene, ect., two types of polypropylene and/or propylene copolymers having melting points differing from each other by more than 10° C., and a foaming agent; and a composition comprising a polypropylene resin containing 10–50 weight % of ethylene and the remaining amount of propylene, which has three or more melting peaks between 100° C. and 165° C., a polyethylene resin and a foaming agent (Japanese Patent Laid-Open Nos. 59-75929 and 64-87641.

However, in each of the above compositions, foams showing a good balance of a sheet moldability by low-temperature extrusion and high-temperature properties, particulary a heat resistance sufficient for carrying out vacuum molding, stamping, etc. can hardly be obtained.

OBJECT AND SUMMARY OF THE INVENTION

Accordingly, an object of the present invention is to provide a cross-linkable, foamable polyolefin resin composition capable of providing foams showing excellent sheet moldability, mechanical properties, formability and heat resistance without substantially deteriorating the machanical properties and heat resistance peculir to polypropylene.

As a result of intense research in view of the above object, the inventors have found that by mixing a propylene-ethylene random copolymer having a relatively larger ethylene content, a propylene-ethylene random copolymer having a relatively smaller ethylene content, a linear low-density polyethylene and a foaming agent, the resulting composition can provide foams showing excellent sheet moldability, mechanical properties, formability and heat resistance without substantially deteriorating the mechanical properties and heat resistance peculiar to polypropylene.

Thus, the cross-linkable, foamable polyolefin resin composition according to the present invention comprises:

(a) 30–80 weight % of a propylene-ethylene random copolymer having an ethylene content of 1.5–6 weight %;

(b) 10–60 weight % of a propylene-ethylene random copolymer having an ethylene content of 0.2–1.0 weight %;

(c) 10–60 weight % of a linear low-density polyethylene;

(d) 1–30 parts by weight, per 100 parts by weight of the total amount of the propylene-ethylene random copolymer (a)+the propylene-ethylene random copolymer (b)+the linear low-density polyethylene (c), of a foaming agent.

DETAILED DESCRIPTION OF THE INVENTION

In the present invention, two types of propylene-ethylene random coplymers: a propylene-ethylene random copolymer (a) having a relatively larger ethylene contact and a propylene-ethylene random copolymer (b) having a relatively smaller ethylene content are used. Incidentally, the term "propylene-ethylene random copolymer" used herein means a random copolymer constituted by propylene and ethylene.

The propylene-ethylene random copolymer (a) has an ethylene content of 1.5–6 weight %, preferably 2.0–4.0 weight %. When the ethylene content of the propylene-ethylene random copolymer (a) is lower than 1.5 weight %, good softness and sufficient sheet moldability cannot be achieved. On the other hand, when it exceeds 6 weight %, good mechanical strength, heat resistance and formability such as vacuum moldability, stampability, etc. cannot be achieved. Such propylene-ethylene random copolymer (a) usually has a melt flow rate (MFR, JIS K210, 2.16 kg load, 230° C.) of 1.0–30 g/10 minutes.

The propylene-ethylene random copolymer (b) has an ethylene content of 0.2–1.0 weight %. When the ethylene content of the propylene-ethylene random copolymer (b) is lower than 0.2 weight %, the cross-linking cannot be conducted efficiently and molding is difficult. On the other hand, when it exceeds 1.0 weight %, good heat resistance cannot be achieved. Such propylene-ethylene random copolymer (b) usually has a melt flow rate (MFR, JIS K7210, 2.16 kg loads, 230° C.) of 3–50 g/10 minutes.

In the present invention, the linear low-density polyethylene (c) is a linear copolymer of ethylene and an α-olefin having 4–8 carbon atoms. The α-olefins include 4-methyl-1-pentene, 1-butene, 1-hexene, etc. The ethylene content of the linear low-density polyethylene is 90 mol % or more, preferably 95 mol % or more. Such linear low-density polyethylene usually has a density of 0.91–0.94 g/cm$^3$ and a melt index (MI, JIS K7210, 2.16 kg load, 190° C.) of 0.7–60 g/10 minutes.

With respect to the proportions of the resin components, the propylene-ethylene random copolymer (a) is 30–80 weight %, preferably 40–70 weight %, the propylene-ethylene random copolymer (b) is 10–60 weight %, preferably 20–50 weight %, and the linear low-density polyethylene (c) is 10–60 weight %, preferably 20–50 weight %, per 100 weight % of the total amount of the propylene-ethylene random copolymer (a)+the propylene-ethylene random copolymer (b)+the linear low-density polyethylene (c).

When the amount of propylene-ethylene random copolymer (a) is less than 30 weight %, sufficient softness and sheet moldability cannot be achieved. On the other hand, when it exceeds 80 weight %, the heat resistance and the formability decrease.

When the amount of propylene-ethylene random copolymer (b) is less than 10 weight %, sufficient mechanical strength and high-heat resistance cannot be obtained. On the other hand, when it exceeds 60 weight %, the sheet moldability decreases.

When the amount of the linear low-density polyethylene (c) is less than 10 weight %, the low-temperature moldability and room temperature properties of the resulting sheets and the softness of the resulting foams are deteriorated. On the other hand, when it exceeds 60 weight %, the mechanical properties and heat resistance peculiar to the polypropylene resins become insufficient.

In the sum of the propylene-ethylene random copolymer (a) and the propylene-ethylene random copolymer (b), the total ethylene content is preferably 0.5–4.0 weight % per 100 weight % of the total amount of the proplylene-ethylene random copolymer (a)+the propylene-ethylene random copolymer (b). When the ethylene content in the sum of the propylene-ethylene random copolymer (a)+the propylene-ethylene random copolymer (b) is lower than 0.5 weight %, sufficient softness and sheet moldability cannot be achieved. On the other hand, when it exceeds 4.0 weight %, foams with sufficient mechanical strength and high heat resistance cannot be obtained. The more preferred ethylene content is 1.0–3.5 weight %.

The foaming agent (d) usable in the present invention are in a liquid or solid state at room temperature, which are decomposed or evaporated when to a temperature higher than the melting points of the resin components. As long as they do not affect the moldability and the cross-linkability of the compositions, any foaming agents can be used, and those having decomposition temperatures of 180°–270° C. are preferable. Specific examples of such preferred foaming agents include azodicarbonamide, azodicarbonate metal salts, dinitrosopentamethylenetetramine, hydrazodicarbonamide, p-toluene sulfonyl semicarbazide, s-trihydrazionotriazine, etc. Such foaming agent is used in an amount of 1–30 parts by weight per 100 parts by weight of the total amount of the resin components (the propylene-ethylene random copolymer (a)+the propylene-ethylene random copolymer (b)+the linear low-density polyethylene (c)). The amount of the foaming agent may be changed depending upon its types and a desired foaming ratio.

In addition to the propylene-ethylene random copolymer (a), the propylene-ethylene random copolymer (b), the linear low-density polyethylene (c) and the foaming agent (d), organic peroxides for cross-linking reaction can be added. Incidentally, when the cross-linking reaction is caused by irradiation, organic peroxides may not be used. When organic peroxides are used, they preferably have decomposition temperatures of about 150° C. or higher. Specific examples of such organic peroxides include methyl ethyl ketone peroxide (182° C.), tert-butylperoxyisopropyl carbonate (153° C.), dicumyl peroxide (171° C.), cumene hydroperoxide (255° C.), 2,5-dimethyl-2,5-di (ter-butylperoxy) hexane (179° C.) 2,5-dimethyl-2,5-di (tert-butylperoxy) hexyne-3 (193° C.), di-tert-butyl peroxyphthalate (159° C.), etc. Such organic peroxides are 0.01–1.0 parts by weight, preferably 0.05–0.5 parts by weight, per 100 parts by weight of the resin components.

To efficiently carry out the cross-linking reaction, a cross-linking aid is perferably added. The cross-linking aids usable in the present invention include trimethylolpropane trimethacrylate, trimethylolpropane triacrylate, pentaerythritol pentaacrylate, diallyl phthalate, diallyl maleate, etc. The amount of the cross-linking aid is 0.5–7.0 parts by weight, preferably 1.0–4.0 parts by weight, per 100 parts by weight of the resin components.

To improve the properties of the cross-linked polyolefin foams, various other additives such as rubbery materials, other resins, pigments, fillers, flame retardants, antioxidants, etc. may be added.

The composition comprising the above-mentioned components is formed into a cross-linked polyolefin foam by the following method:

First, the propylene-ethylene random copolymer (a), the propylene-ethylene random copolymer (b), the linear low-density polyethylene (c), the foaming agent (d), and optionally the organic peroxide, the cross-linking aid and other additives are blended in a kneader, a Henschel mixer, an extruder, etc. In this case, the melt-blending temperature should be lower than the decomposition temperature of the foaming agent. The preferred melt-blending temperature is 160°–180° C.

The resulting blend was extruded through a die of an extruder, etc. to form a sheet, etc. In this case, the die temperature is preferably controlled in the range of 165°–175° C.

The sheet thus obtained is cross-linked. The cross-linking can be carried out by using organic peroxides or by irradiation of α-rays, β-rays (electron beam), γ-rays, etc., or by heating. Among them, the irradiation is preferable, and particulary the electron beam irradiation is most preferable. The amount of irradiation may vary depending upon the types of the cross-linking aid, etc., but it is generally 0.1–50 Mrad, preferably 1–30 Mrad.

The polyolefin resin sheet thus cross-linked is then foamed at a temperature higher than the melting points of the resin components, preferably at 230° C. or higher, more preferably at 240°–270° C. The heating time necessary for foaming is usually 0.5–5 minutes.

Since the cross-linkable, foaming polyolefin resin composition of the present invention comprises the propylene-ethylene random copolymer having a relatively larger ethylene content, the propylene-ethylene random copolymer having a relatively smaller ethylene content, the linear low-density polyethylene and the foaming agent, it can provide foams showing excellent sheet moldability, mechanical properties, formability and heat resistance without substantially deteriorating the mechanical properties and heat resistance peculiar to polypropylene.

The reason therefor is not necessarily clear, but it may be considered that the propylene-ethylene random copolymer having a relatively larger ethylene content is excellent in softness, sheet moldability and foaming properties, the propylene-ethylene random copolymer having a relatively smaller ethylene content is excellent in a heat resistance, a tensile strength, a tear strength, etc., and the linear low-density polyethylene shows excellent compatibility with these propylene-ethylene random copolymers and provides them with good moldability.

The present invention will be explained in further detail by way of the following Examples. Incidentally, in each of Examples and Comparative Examples, the following starting materials were used:

[1] Propylene-ethylene random copolymer (a)
   RPP(a)(I): [ethylene content: 3.6 weight %, melt flow rate (MFR, 230° C., 2.16 kg load)=9 g/10 minutes, melting point: 148° C.].
   RPP(a)(II): [ethylene content: 2.3 weight %, melt flow rate (MFR, 230° C., 2.16 kg load)=9 g/10 minutes, melting point: 151° C.].

[2] Propylene-ethylene random copolymer (b)
   RPP(b)(I): [ethylene content: 0.4 weight %, melt flow rate (MFR, 230° C., 2.16 kg load)=3 g/10 minutes, melting point: 157° C.].
   RPP(b)(II): [ethylene content: 0.8 weight %, melt flow rate (MFR, 230° C., 2.16 kg load)=15 g/10 minutes, melting point: 153° C.].

[3] Linear low-density polyethylene
   LLDPE: [melt index (MI, 190° C., 2.16 kg load)=2.5 g/10 minutes, density: 0.920 g/cm$^3$]

EXAMPLES 1-5

A propylene-ethylene random copolymer (a), a propylene-ethylene random copolymer (b) and a linear low-density polyethylene (c) were mixed in proportions as shown in Table 1, and 100 parts by weight of the resulting resin mixture was mixed with 15 parts by weight of azodicarbonamide as a foaming agent, a cross-linking aid and an antioxidant, and then blended in a Henschel mixer at 500 rpm for 2 minutes. The resulting blend was supplied to a double-screw extruder (40 mm $\phi$, length/diameter (L/D)=28) and extruded at 170° C. to form pellets.

The pellets were then supplied to a single-screw sheet former equipped with a T-die (50 mm $\phi$, L/D=28) and extruded at 170° C. to form a sheet having a thickness of 1.0 mm.

This sheet was irradiated with electron beam at 6 Mrad to cause cross-linking. Thereafter, it was placed in an air oven at 250° C. for 2 minutes to decompose the foaming agent, thereby foaming the sheet about 30 times.

Each cross-linked foamed sheet thus obtained was measured with respect to a density after foaming, a gel percentage, a specific strength, a tensile strength, a tensile elongation and a tear strength at 23° C., and a specific strength, a tensile strength, a tensile elongation and a high-temperature dimensional stability at 130° C.

The results are shown in Table 1 together with the compositions of the resin mixtures.

COMPARATIVE EXAMPLES 1, 2

Without using a propylene-ethylene random copolymer (b), a propylene-ethylene random copolymer (a) and a linear low-density polyethylene (c) were mixed in proportions as shown in Table 1, and 100 parts by weight of the resulting resin mixture was mixed with 15 parts by weight of azodicarbonamide as a foaming agent, a cross-linking aid and an antioxidant, and then blended in a Henschel mixer at 500 rpm for 2 minutes. The resulting blend was supplied to a double-screw extruder (40 mm $\phi$, length/diameter (L/D)=28) and extruded at 170° C. to form pellets.

The pellets were then supplied to a single-screw sheet former equipped with a T-die (50 mm $\phi$, L/D=28) and extruded at 170° C. to form a sheet having a thickness of 1.0 mm.

This sheet was irradiated with electron beam at 6 Mrad to cause cross-linking. Thereafter, it was placed in an air oven at 250° C. for 2 minutes to decompose the foaming agent, thereby foaming the sheet about 30 times.

Each cross-linked foamed sheet thus obtained was measured with respect to a density after foaming, a gel percentage, a specific strength, a tensile strength, a tensile elongation and a tear strength at 23° C., and a specific strength, a tensile strength, a tensile elongation and a high-temperature dimensional stability at 130° C.

The results are also shown in Table 1 together with the compositions of the resin mixtures.

TABLE 1

| Resin Components (Weight %) | Example No. | | | |
|---|---|---|---|---|
| | 1 | 2 | 3 | 4 |
| A. Propylene-Ethylene Random Copolymer | | | | |
| RPP(a)(I) | 42 | 28 | 21 | 14 |
| RPP(a)(II) | — | — | — | — |
| RPP(b)(I) | 28 | 42 | 49 | 56 |
| RPP(b)(II) | — | — | — | — |
| Ethylene Content (Weight %)[1] | 2.3 | 1.7 | 1.3 | 1.0 |
| B. LLDPE | 30 | 30 | 30 | 30 |
| Electron Beam Irradiation (Mrad) | 6 | 6 | 6 | 6 |
| Properties of the Resulting Sheet | | | | |
| Gel Ratio (Weight %) | 46 | 45 | 45 | 43 |
| Apparent Density After Foaming (g/cm$^3$) at 23° C. | 0.034 | 0.033 | 0.033 | 0.034 |
| Specific Strength[2] (cm, × 10$^3$) | 221/212 | 258/248 | 297/293 | 329/315 |
| Tensile Strength[3] (kg/cm$^2$) | 7.5/7.2 | 8.5/8.2 | 9.8/9.7 | 11.2/10.7 |
| Tensile Elongation[4] (%) | 430/410 | 420/400 | 440/420 | 430/400 |
| Tear Strength[5] (kg/cm) | 5.5/5.9 | 6.1/6.5 | 7.1/7.6 | 8.5/9.2 |

TABLE 1-continued

| at 130° C. | | | | |
|---|---|---|---|---|
| Specific Strength[6] (cm. × 10³) | 34/33 | 36/35 | 43/41 | 49/46 |
| Tensile Strength[7] (kg/cm²) | 1.15/1.12 | 1.20/1.15 | 1.42/1.35 | 1.65/1.55 |
| Tensile Elongation[8] (%) | 600/530 | 550/510 | 520/500 | 550/470 |
| High-Temperature Dimensional Stability[9] (%) (at 120° C.) | −0.7/−0.6 | −0.5/−0.3 | −0.5/−0.4 | −0.3/−0.3 |

| | Example No. | | Comparative Example No. | |
|---|---|---|---|---|
| Resin Components (Weight %) | 5 | 6 | 1 | 2 |
| A. Propylene-Ethylene Random Copolymer | | | | |
| RPP(a)(I) | — | 21 | 70 | — |
| RPP(a)(II) | 45 | — | — | 70 |
| RPP(b)(I) | 55 | — | — | — |
| RPP(b)(II) | — | 49 | — | — |
| Ethylene Content (Weight %)[1] | 1.3 | 1.7 | 3.6 | 2.3 |
| B. LLDPE | 30 | 30 | 30 | 30 |
| Electron Beam Irradiation (Mrad) | 6 | 6 | 6 | 6 |
| Properties of the Resulting Sheet | | | | |
| Gel Ratio (Weight %) | 43 | 45 | 44 | 45 |
| Apparent Density After Foaming (g/cm³) | 0.032 | 0.033 | 0.033 | 0.033 |
| at 23° C. | | | | |
| Specific Strength[2] (cm, × 10³) | 272/266 | 309/297 | 203/197 | 182/156 |
| Tensile Strength[3] (kg/cm²) | 8.7/8.5 | 10.2/9.8 | 6.7/6.5 | 6.0/5.2 |
| Tensile Elongation[4] (%) | 420/390 | 450/430 | 450/410 | 350/300 |
| Tear Strength[5] (kg/cm) | 7.0/7.2 | 7.3/7.5 | 5.2/5.7 | 4.2/4.7 |
| at 130° C. | | | | |
| Specific Strength[6] (cm, × 10³) | 41/39 | 44/42 | 27/24 | 24/21 |
| Tensile Strength[7] (kgf/cm²) | 1.32/1.25 | 1.45/1.40 | 0.82/0.79 | 0.78/0.69 |
| Tensile Elongation[8] (%) | 430/410 | 550/510 | 330/250 | 260/230 |
| High-Temperature Dimensional Stability[9] (%) (at 120° C.) | −0.4/−0.3 | −0.5/−0.5 | −1.3/−1.0 | −1.0/−0.9 |

Note:
[1] Based on 100 weight % of propylene-ethylene random copolymers (a) and (b) [in Comparative Examples, (a) alone)].
[2-8] Data in a longitudinal (machine) direction (MD)/ in a transverse direction (TD) measured according to JIS K6767.
[9] Expressed by a shrinkage ratio (%) in a longitudinal (machine) direction (MD)/ in a transverse direction (TD) measured after keeping each sample at 120° C. for 22 hours.

As is clear from Table 1, the compositions of Examples provide cross-linked foams with better specific strength, tensile strength, tensile elongation and tear strength at room temperature, and better specific strength, tensile strength and tensile elongation at a high temperature, and also better high-temperature dimensional stability than those of Comparative Examples 1 and 2 containing only the propylene-ethylene random copolymer (a) and the linear low-density polyethylene (c) as resin components.

Particularly, with respect to the composition of Example 1 and that of Comparative Example 2, foams obtained from Example 1 are extremely superior to those of Comparative Example 2 in a specific strength, a tensile strength, a tensile elongation and a high-temperature dimensional stability, despite the fact that there is no difference between them with respect to the total ethylene content in the sum of the propylene-ethylene random copolymers.

As described above in detail, since the cross-linkable, foamable polyolefin resin composition of the present invention contains a propylene-ethylene random copolymer having a relatively larger ethylene content, a propylene-ethylene random copolymer having a relatively smaller ethylene content, a linear low-density polyethylene and a foaming agent, foams obtained from this composition show good mechanical properties, formability, and heat resistance without substantially deteriorating the properties peculiar to polypropylene.

By utilizing these excellent heat resistance and mechanical properties, foams obtained from the cross-linkable, foamable polyolefin resin composition of the present invention can be suitably used for interior materials of automobiles (ceilings, door rims, etc.), various home electrical appliances, sporting goods, cushions for food wrappings, heat insulators, sound dampers, exterior materials, etc.

What is claimed is:

1. A cross-linkable, foamable polyolefin resin composition comprising:
   (a) 30–80 weight % of a propylene-ethylene random copolymer having an ethylene content of 1.5–6 weight %;
   (b) 10–60 weight % of a propylene-ethylene random copolymer having an ethylene content of 0.2–1.0 weight %;
   (c) 10–60 weight % of a linear low-density polyethylene; and
   (d) 1–30 parts by weight, per 100 parts by weight of the total amount of said propylene-ethylene random copolymer (a)+said propylene-ethylene random copolymer (b)+said linear low-density polyethylene (c), of a foaming agent.

2. The cross-linkable, foamable polyolefin resin composition according to claim 1, wherein the ethylene content in a mixture of said propylene-ethylene random copolymer (a) and said propylene-ethylene random copolymer (b) is 0.5–4.0 weight % per 100 weight % of said propylene-ethylene random copolymer mixture.

3. The cross-linkable, foamable polyolefin resin composition according to claim 1, wherein said composition provides a foam having a specific strength of 200 × 10³ cm or more and a tensile elongation of 350% or more at 23° C. and a specific strength of 30 × 10³ cm or more and a tensile elongation of 350% or more at 130° C. in both of MD and TD directions.

4. The cross-linkable, foamable polyolefin resin composition according to claim 2, wherein said composition provides a foam having a specific strength of $200 \times 10^3$ cm or more and a tensile elongation of 350% or more at 23° C. and a specific strength of $30 \times 10^3$ cm or more and a tensile elongation of 350% or more at 130° C. in both of MD and TD directions.

* * * * *